United States Patent [19]
Torbus

[11] Patent Number: 4,678,816
[45] Date of Patent: * Jul. 7, 1987

[54] MOULD MATERIAL BINDING AGENT SYSTEM WHICH COLD-HARDENS WITH FORMATION OF POLYURETHANE

[75] Inventor: Marek Torbus, Düsseldorf, Fed. Rep. of Germany

[73] Assignee: Hüttenes-Albertus Chemische Werke GmbH, Fed. Rep. of Germany

[*] Notice: The portion of the term of this patent subsequent to Dec. 10, 2002 has been disclaimed.

[21] Appl. No.: 808,456

[22] Filed: Dec. 12, 1985

[30] Foreign Application Priority Data

Dec. 14, 1984 [DE] Fed. Rep. of Germany ....... 3445687

[51] Int. Cl.$^4$ ............................................. C08L 75/00
[52] U.S. Cl. ................................... 523/142; 524/730; 524/742; 524/773; 524/774; 524/775; 528/28; 528/48; 528/85
[58] Field of Search ................ 523/142; 524/730, 742, 524/746, 773, 774, 775; 528/28, 48, 85

[56] References Cited

U.S. PATENT DOCUMENTS 3,388,120 6/1968 Brizgys ................................. 524/370
3,734,936 5/1973 Brown et al. ........................ 524/730
3,965,057 6/1976 Ammons et al. .................... 524/730
4,558,074 12/1985 Torbus ................................ 524/730

*Primary Examiner*—Maurice J. Welsh
*Attorney, Agent, or Firm*—Dressler, Goldsmith, Shore, Sutker & Milnamow, Ltd.

[57] ABSTRACT

This invention relates to a mould material binding agent system for the manufacture of foundry mould parts. This binding agent system contains, as components, a solution of a phenol-containing polyol having at least two OH-groups in the molecule and a polyisocyanate, optionally in the form of a solution, having at least two NCO-groups in the molecule, which react with each other to a cold-hardening binding agent with formation of polyurethane. As polyisocyanate component there are used (optionally phenyl-substituted) diphenyl-4,4′, diisocyanates having a content of more than 10% by wt. (referred to the total quantity of polyisocyanate), preferably more than 20% by wt., of the isomeric diphenyl-2,4′-diisocyanate (likewise optionally phenyl-substituted), which also contain an addition of a small quantity of acid chlorides and/or chlorosilanes.

With the invention, a simply and economically manufactured binding agent is created, which combines high initial strengths of the mould parts with good sand lives of the mould material mixture.

3 Claims, No Drawings

MOULD MATERIAL BINDING AGENT SYSTEM WHICH COLD-HARDENS WITH FORMATION OF POLYURETHANE

BACKGROUND ART

In the production of foundry mould parts, the binding agent systems which cold-harden with formation of polyurethane have achieved an increasing importance. These binding agent systems consist of two components, namely a polyol (normally dissolved in a solvent) having at least two OH-groups in the molecule and a polyisocyanate (usually also dissolved in a solvent) having at least two NCO-groups in the molecule. The two components, which are added separately to the mould material mixture, react in the mould material mixture to a hardened polyurethane binding agent, this reaction taking place in the presence of catalysts which assure a rapid reaction and thus satisfactorily short hardening time. As catalysts, apart from other substances such as metallo-organic compounds, tertiary amines in particular may be considered, which are introduced into the mould-making mould as lightly volatile amines with a carrier gas after the forming of the mould material mixture.

The polyol component is usually a condensation product, dissolved in a solvent, of (optionally substituted) phenols with aldehydes (hereinafter termed "phenolic resin" for short), which possesses a small to medium degree of condensation and comprises a fairly large number of free OH-groups in the molecule. In specific cases, especially in the case of mould parts for lower casting temperatures, the polyol component may, however, also be a solution of an oligomeric, dimeric or monomeric phenol body, for example of a terphenol, bisphenol or dihydroxybenzol. For all these polyols there is available a large number of (generally polar) solvents. The solutions are normally adjusted to a solids content of 40–60% by wt. and can contain also usual additives.

As polyisocyanate component, in principle any polyisocyanates having at least two NCO-groups in the molecule may be considered. Preferred are aromatic polyisocyanates, for which diphenyl methane-4,4'-diisocyanate, 2,2', 6,6'-tetramethyl diphenyl methane 4,4'-diisocyanate, diphenyl dimethyl methane-4,4'-diisocyanate and diphenyl-4,4'-diisocyanate may be named as typical examples. The polyisocyanates may form the polyisocyanate component in pure form or dissolved in an organic solvent (preferably a mixture of aromatic hydrocarbons having a boiling range above 150° C.). In the case of a solution, the concentration of the polyisocyanate in general is above 70% by wt.

For the production of a mould material mixture, a granular base mould material (quartz sand, chromite sand, olivine sand, zirconium sand or the like) is mixed with the two binding agent components, the ratios of the two components being approximately in the range from 0.5 to 1.5 parts by wt. polyisocyanate component to 1 part by wt. polyol component and preferably of such values that a virtually stoichiometric ratio of the NCO-groups to the OH-groups results. The mould material mixture is then worked to form foundry mould parts by being placed in a mould-making mould, if necessary compacted and thereafter hardened, for example by brief gasification with a slightly volatile tertiary amine (such as dimethylethylamine, triethylamine or the like). The mould parts can then be removed from the mould-making mould.

Even as early as the gasification stage, the mould parts achieve a measurable strength ("initial strength"), which slowly increases after the end of gasification to the final strength values. In practice, sufficiently high initial strengths are desired for the mould parts to be removed from the mould-making mould if possible immediately after gasification and the mould-making mould if possible immediately after gasification and the mould-making mould can then be available again for a new moulding operation. At the same time, however, practice demands that the time during which the mould material mixture mixed with the two binding agent components can be stored before further processing to mould parts (the so-called "sand life") shall be as long as possible and that the initial strength values shall change as little as possible during this period.

The less the two binding agent components enter into a premature reaction with one another during storage of the mould material mixture, the better will the sand life be. Accordingly, it is possible to increase the sand life by addition of inhibitors of the urethane reaction; these inhibitors must be such in type and quantity that they only inhibit the spontaneous premature forming of urethane during storage of the mould material mixture, and not the desired forming of urethane after addition of the hardening catalyst, e.g. after amine gasification. It is known, for this purpose, to add to the polyisocyanate component of the binding agent a small quantity (for example up to 2% by wt.) of acid chlorides, both aliphatic and aromatic acid chlorides and acid sulphochlorides, such as acetyl chloride, stearyl chloride, benzoyl chloride, toluol sulphochloride or phthaloyl chloride being suitable. Our own, earlier West German patent application No. P 34 05 180.5 (now DE-05 3405 180) in West Germany and equivalent to U.S. Pat. No. 4,558,074 describes, for this purpose, an addition of up to 2% by wt. of chlorosilanes, such as for example trimethyl chlorosilane, dimethyl dichlorosilane, methyl trichlorosilane, tetrachlorosilane, diethychlorosilane, vinyltrichlorosilane and diphenyl dichlorosilane to the polyisocyanate component.

The known inhibitors lead, also, actually to an improvement in the sand life up to a doubling of same, therefore for example to an increase of the sand life from one hour to two hours. In many practical cases, however, this is still insufficient and in particular the known inhibitors are not sufficiently active when the mould material mixture is manufactured with regenerated old sands. Such regenerated old sands, which have increasing importance in foundry technology, usually have a temperature above 30° C., with the result that the urethane reaction is accelerated, and they also contain iron oxide and other impurities having a catalytic effect on the urethane reaction, and therefore are specially critical in respect of the sand life.

BRIEF DESCRIPTION OF THE INVENTION

It is the objective of the present invention to make available to foundry technology an improved binding agent on the basis of a system which cold-hardens to form polyurethane, which system, in conjunction with good initial strength values for the mould parts, leads to longer sand life values than could previously be achieved with inhibitors, and which gives better sand life times even with hot and/or contaminated mould material mixtures, such as those from regenerated old sands.

Starting from a mould material binding agent system of the initially described type, the polyisocyanate component of which is a substituted or unsubstituted diphenyl-4,4'-diisocyanate and contains an addition of acid chlorides and/or chlorosilanes, this objective is achieved according to the present invention in that the polyisocyanate component has a content of more than 10% by wt., preferably more than 20% by wt., of a substituted or unsubstituted diphenyl-2,4'-diisocyanate, the percentage stated relating to the total quantity of polyisocyanate. Additionally, the polyisocyanate component may contain also the corresponding 2,2'-isomer.

The invention is based upon the surprising discovery that the sand lives of mould material mixtures can be appreciably increased, namely up to sometimes more than three times the best times hitherto achievable, if the hitherto usual diphenyl-4,4'-diisocyanates (substituted or unsubstituted) are entirely or partly replaced by the 2,4'-isomer. It was found moreover, entirely unexpectedly, that an improvement in the sand lives which occurred even in those mould material mixtures which have a raised temperature (up to 50° C. and more) and/or which are polluted by iron oxide and other catalytically acting substances. Furthermore, even mould material mixtures having a content of basically acting sands, such as for example chromite sand or olivine sand, which are necessary for specific foundry procedures and hitherto have been characterized by excessively short sand lives, now achieve improved values for the sand life.

This pronounced effect of the diphenyl-2,4'-diisocyanates upon the sand lives, even of those mould material mixtures which previously could not be brought to satisfactory values with diphenyl-4,4'-diisocyanates in combination with an inhibitor, was not foreseeable. It also cannot be explained by a worsened reactivity of the 2,4' isomers compared to the 4,4' isomers, since the initial strength values of the mould parts are practically the same in both cases. In general, it has been found that the sand life period becomes longer the higher the proportion of the 2,4' isomer in the poly-isocyanate component, and therefore in principle can be adjusted to almost any requirements of foundry work. Contents below 10% by wt. show no detectable effect, while the upper limit is determined only by the price, since the 2,4'-isomers are generally at present somewhat more expensive than the 4,4'-isomers.

Suitable for the purposes of the invention are, basically, all substituted or unsubstituted diphenyl-2,4'-diisocyanates, of which the 4,4'-isomers are at present common, therefore in particular diphenyl methane-2,4'-diisocyanate, 2,2', 6,6'-tetramethyl diphenyl methane-2,4'-diisocyanate, diphenyl dimethyl methane-2,4'-diisocyanate and diphenyl-2,4'-diisocyanate. For mixtures of 2,4'-isomers and 4,4'-isomers it is advisable, but not necessary, to start from the same substituents in each case, and therefore, for example, to mix diphenyl methane-2,4'-diisocyanate with diphenyl methane-4,4'-diisocyanate and diphenyl-2,4'-diisocyanate with diphenyl-4,4'-diisocyanate. In each case, as before, the polyisocyanate component can be used either in pure form or in solution.

The invention can be used for all binding agent systems on a polyurethane basis, and therefore can be employed in conjunction with all usual polyol components and also does not require any changes in the manufacture and working of the mould material mixtures.

Best Modes for Carrying Out the Invention

The examples described below and summarized in the tables explain the invention.

In all cases, mould material mixtures were produced, which each contained as polyol component the same commercially available solution of an OH-group-containing phenolic resin of the benzyl ether type, and the other components of which are explained below. These mould material mixtures were worked according to DIN 52401 by means of a shooting machine to test specimens (cores), which were hardened by brief gassing with dimethyl isopropyl amine and then scavenged for 10 seconds with air. In the subsequent investigation, the values given in tables 1-3 were obtained.

In the tables, the columns "mixture immediately worked" and "mixture stored . . . hours" refer to the time from manufacture of the mixture to addition of the catalyst, i.e. to gasification. In the first case, the mixture was worked immediately after its production and the cores obtained were tested within 15 seconds (immediately) and within 1 and 24 hours respectively after completion of gassing. The immediate testing supplied the initial strength values and the testing after 1 hour and 24 hours respectively allows the increase in strength to the final strength to be recognized. In the second case, on the other hand, the values are based upon mould material mixtures which had initially been stored for the stated period without addition of the catalyst, before the cores were shot in the corresponding manner and the values for the time-dependence of the bending strenght (= sand life) were recorded.

Table 1, in which the results of examples 1 to 3 are summarized, illustrates the noticeable increase in the sand life by the invention for quartz sand and room temperature. In these examples, the mould material mixture consisted in each case of 100 parts by wt. quartz sand H33, 1 part by wt. phenolic resin and 1 part by wt. polyisocyanate component. The mixture had a temperature of 24° C. and was stored also at this temperature. As polyisocyanate components, the following were used:

EXAMPLE 1 (reference example)

80 parts by wt. diphenyl methane-4, 4'-diisocyanate, commercial quality (i.e. containing approximately 10% by wt. diphenyl methane-2,4'-diisocyanate and traces of the 2,2'-isomer)
20 parts by wt. solvent, solvent naphtha EXAMPLE 2 (reference example)

80 parts by wt. diphenyl methane-4,4'-diisocyanate, technical quality
20 parts by wt. solvent, solvent naphtha
1.0% by wt. of a 1:1 mixture of dimethyl dichlorosilane and o-phthaloyl chloride EXAMPLE 3 (invention)

20 parts by wt. diphenyl-methane 4,4'-diisocyanate, commercial quality
60 parts by wt. diphenyl methane diisocyanate, comprising 40% by wt. of the 2.4'-isomer
20 parts by wt. solvent, solvent naphtha
1.0% by wt. of a 1:1 mixture of dimethyl dichlorosilane and o-phthaloyl chloride The total quantity of the 2,4'-isomer in the polyisocyanate component was thus, in example 3 according to this invention, 26% by wt. With this proportion of the 2,4'-isomer, the strength values, especially the initial strengths, were still fully usable even after 6 hours storage time of the mixture, whereas the mixtures according to the two reference examples were only usable to a limited extent after only 2 hours storage time.

Table 2 summarizes the results of examples 4 and 5 and illustrates the action of the invention at raised temperature of the mould material mixture. The mixture according to example 4 was here the same as the mixture according to example 2 (reference example), and the mixture according to example 5 was the same as the mixture according to example 3 (invention). The temperature of the mixtures, however, was approximately 45°–50° C., and the mixtures were also stored at this temperature. It will be noted that the mixture according to this invention according to example 5 still exhibited a slight increase of the initial strength after 2 hours storage, but the reference mixture according to example 4 was useless after only 1 hour.

Table 3, in which the results of examples 6 and 7 are summarized, enables the improved sand life with a so-called problem sand according to this invention to be seen. In examples 6 and 7, the mould material mixture in each case was made with a sand mixture of
50 parts by wt. quartz sand H33
50 parts by wt. chromite sand and
0.2 parts by wt. additive, $Fe_2O_3$.

The other components of the mould material mixtures were the same in example 6 as in example 2 (reference example) and the same in example 7 as in example 3 (invention). The temperatures of the mixtures in examples 6 and 7 were again 24° C., including during the storage time. In this case, the initial strength of the referene mixture according to example 6 had fallen after only 2 hours storage to a smaller value than in the case of the mixture of this invention according to example 7 after 6 hours storage.

It should be particularly pointed out that in all cases the initial strength values in the examples according to this invention, 3, 5 and 7 were much more uniform throughout the storage periods than in the associated reference examples. This is an especially important success of the invention for practical purposes.

What is claimed is:

1. A mould material binding agent composition for the manufacture of foundry mould parts comprising a solution of a phenol-containing polyol having at least two OH-groups in the molecule and a polyisocyanate component having at least two NCO-groups in the molecule, said polyol and polyisocyanate component reacting with each other to form a cold-hardening binding agent, the polyisocyanate component containing a member of the group consisting of substituted and unsubstituted diphenyl-4, 4'-diisocyanates together with an addition of a member of the group consisting of acid chlorides and chlorosilanes and mixtures thereof, said polyisocyanate component also containing more than 10% by weight of a member of the group consisting of substituted and unsubstituted diphenyl-2, 4'-diisocyanates and mixtures thereof, the percentage relating to the total quantity of polyisocyanate component.

2. The composition of claim 1 wherein said polyisocyanate component is in a solution.

3. The composition of claim 1 wherein said polyisocyanate component contains more than 20% by weight of said substituted and/or unsubstituted diphenyl-2,4'-diisocyanate.

* * * * *